(12) United States Patent
Barina et al.

(10) Patent No.: US 6,507,487 B1
(45) Date of Patent: Jan. 14, 2003

(54) REMOVABLE STRUCTURES FOR MOUNTING COMPUTER DRIVE DEVICES, PIVOTABLE BETWEEN OPERATING AND SERVICE POSITIONS

(75) Inventors: Richard Michael Barina, Lake Worth, FL (US); Timothy S. Bass, Chapel Hill, NC (US); Dean Frederick Herring, Youngsville, NC (US); William Fred Otto, Apex, NC (US); Rodrigo Samper, Raleigh, NC (US); Susan Pohl Wise, Leasburg, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/708,349

(22) Filed: Nov. 8, 2000

(51) Int. Cl.⁷ .................................................. G06F 1/16
(52) U.S. Cl. ........................ 361/685; 361/683; 361/686; 312/236
(58) Field of Search ................................. 361/679, 683, 361/686, 724–727; 312/236, 257 A, 319, 320

(56) References Cited

U.S. PATENT DOCUMENTS

| | | | |
|---|---|---|---|
| 4,728,160 A | * 3/1988 | Mondor et al. ............. | 312/236 |
| 5,136,466 A | * 8/1992 | Remise et al. .............. | 361/391 |
| 5,172,305 A | 12/1992 | DeWilde ..................... | 361/415 |
| 5,495,389 A | * 2/1996 | Dewitt et al. ............... | 361/683 |
| 5,784,251 A | 7/1998 | Miller et al. ................ | 361/683 |
| 5,784,252 A | 7/1998 | Villa et al. .................. | 361/683 |
| 5,973,918 A | 10/1999 | Felcman et al. ............ | 361/683 |

* cited by examiner

Primary Examiner—Darren Schuberg
Assistant Examiner—Yean Hsi Chang
(74) Attorney, Agent, or Firm—Ronald V. Davidge

(57) ABSTRACT

A computing system includes a frame and a drive mounting structure for mounting one or more drive units within the computing system, with the drive mounting structure being pivotally and removably mounted on the frame to move between an operating position, in which an internal end of a drive unit mounted within the drive mounting structure is held within the computing system, and a service position, in which the internal end of the drive unit extends outward from the computing system. In the service position, access is provided to an open end of the drive mounting structure, into which the drive unit can be installed, to the internal end of the drive unit, for attachment of a cable, and to a side of the drive mounting structure, through which fasteners are driven to mount the drive unit within the drive mounting structure.

3 Claims, 2 Drawing Sheets

REMOVABLE STRUCTURES FOR MOUNTING COMPUTER DRIVE DEVICES, PIVOTABLE BETWEEN OPERATING AND SERVICE POSITIONS

CROSS-REFERENCE TO A RELATED APPLICATION

This application is related to a co-pending U.S. application, Ser. No. 09/606,512, file. on Jun. 28, 2000, having a common assignee with the present application, the disclosure of which is hereby incorporated by reference. This copending application describes a structure, for mounting drive devices, which may be removed entirely from the frame of a computing system and rotated so that a preferred orientation of the drive devices is maintained whether the computing system is used with the frame in a horizontal or vertical orientation.

This application is also related to a co-pending U.S. application, Ser. No. 09/651,164, filed on Aug. 30, 2000, having a common assignee with the present application, the disclosure of which is hereby incorporated by reference. This co-pending application describes a bracket into which a drive device is rotated to be held in place by springs and by dowels replacing the screws conventionally fastened into a side of the drive device.

BACKGROUND INFORMATION

1. Field of Invention

This invention relates to a cage or bracket for mounting a drive device within a computer, and, more particularly, to a cage or bracket movable into a position providing access to screws mounting the drive device and easily removable from the computer.

2. Description of the Related Art

Typical computer systems include a number of device bays, in which drive devices are mounted by installation from the front of the system. Such drive devices, which are often called DASD (Direct Access Storage Device) drives, include floppy disk drives, hard disk drives, and CD ROM drives. Often, these bays do not provide access to insert screws to engage the threaded mounting holes provided within the drive devices. While these mounting holes are typically provided along the left and right sides of the drive device, and often also along the bottom surface of the drive device, in many computing systems the bays only provide for attachment access from the front of the system. In many computer systems, drives are mounted in a side-by-side arrangement, preventing access to the screw holes on the side of each drive adjacent the other drive. Therefore, a number of adapters have been devised to fasten to various of the threaded mounting holes of a drive device, with the device attached to the adapter being installed from the front of the computer system. For example, a slide may be screwed to each side of a drive device, with the frame surfaces forming the drive bay being adapted to provide recesses for sliding engagement with the slides on opposite sides of the drive device.

What is needed is a structure, such as a cage, for mounting a drive, which is itself movable from an operating position, in which it is held closely among adjacent structures of the computing system, and a service position, in which access to the screws mounting the drive within the structure. It is particularly desirable that at least one drive unit may be mounted within such a structure without a need to attach side rails of other types of adapter plates.

U.S. Pat. No. 5,495,389 describes a personal computer including a frame unit and a top cover mounted to pivot upward and outward to the rear of the system, or alternately upward to the side. One or more drive devices may be mounted to extend downward from the top cover. Pivoting the top cover from its closed, operating position, to its open position provides access to the drive devices from below and to components, such as adapter cards and the main system board, from above. The top cover includes, extending along its lower surface, a device mounting bracket including a number of slotted channels. Each drive device is attached to the device mounting bracket by means of a pair of sideplates, fastened to the sides of the device with screws, with tabs of the sideplates extending upward into the slots in the channels. When the drive device is installed, a latching mechanism holds the tabs in place within the slots. Again, what is needed is a structure mounting a drive device directly, without a need for adapter hardware, such as sideplates and a latching mechanism.

U.S. Pat. Nos. 5,784,251 and 5,784,252 describe personal computers each having a main chassis section and a subchassis hinged to pivot along a horizontal axis between a folded-in position, and a folded-out position. The subchassis section includes a power supply and several drive units, which move together with the subchassis as it is pivoted. In U.S. Pat. No. 5,784,251, the subchassis extends over the main chassis section, and the pivoting motion is used to provide access to a main system board mounted in the main chassis section. In U.S. Pat. No. 5,784,252, the subchassis section extends over an end portion of the main chassis section, and the pivoting motion is used to provide access within an area between the main chassis section and the subchassis.

Similarly, U.S. Pat. No. 5,973,918 describes a computing system having a pair of drive units mounted on the top surface of a plate pivoted along the front edge of the system. Both drive units move together, with the plate as it is pivoted to gain access to components mounted below the plate.

In U.S. Pat. Nos. 5,784,252, 5,784,253, and 5,973,918, the pivoting movement does not address the problems associated with access to mounting locations for closely-spaced drive units, which are directed away from the areas opened by pivoting.

SUMMARY OF THE INVENTION

According to a first aspect of the present invention, apparatus is provided for installing a drive unit within a computing system. The apparatus includes a frame of the computing system, and a first drive mounting structure for holding the drive unit. The frame includes a first pivotal mounting structure. The first drive mounting structure is pivotally mounted within the first pivotal mounting structure to move between an operating position holding a drive unit installed therein in an orientation with an interior end of the drive unit within the computing system and a service position holding the drive unit installed therein with the interior end of the drive unit extending outward from the computing system.

DESCRIPTION OF THE INVENTION

Figure 1:
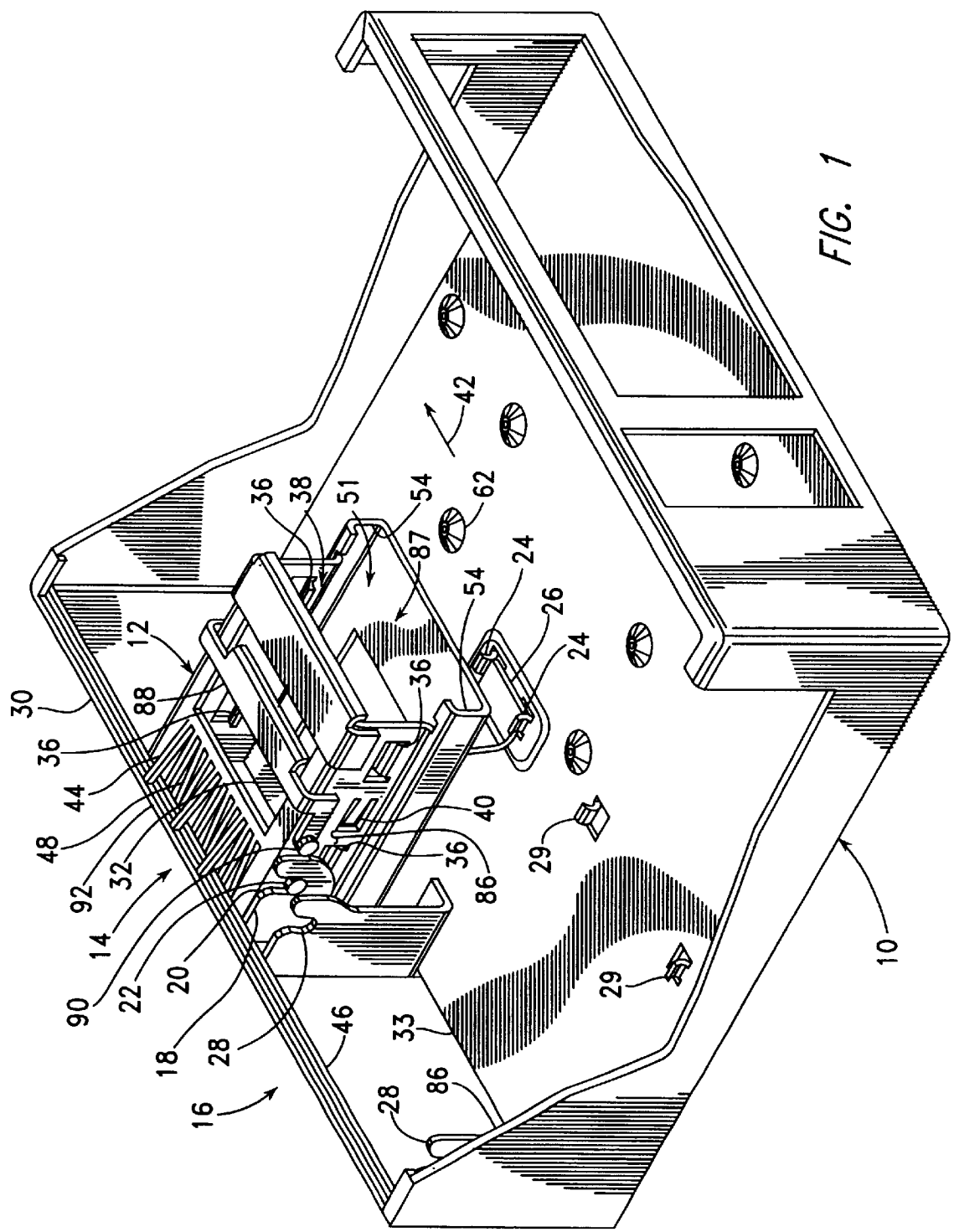
FIG. 1 is an isometric view of a frame for a computing system, as viewed from above, from the rear, and from the right side of the system, including a rotatable drive-mounting structure, built in accordance with the present invention, shown in an operating position.

FIG. 1 is an isometric view of a computer system frame 10 including a rotatable and removable drive mounting structure 12, which are together built in accordance with the present invention. The drive mounting structure 12 is shown in the lower, or operating position, which is used during system operation. The frame 10 includes a first drive mounting area 14, in which the first drive mounting structure 12 is provided for mounting 3.5-inch drive units, and a second drive mounting area 16, in which a second drive mounting structure (not shown) is provided for mounting 5.25-inch drive units.

The drive mounting areas 14, 16 of the frame 10 include a number of features associated with the mounting of the first drive mounting structure 12 and of the second drive mounting structure (not shown). For example, the first drive mounting area 14 includes a first pivotal mounting structure in the form of a pair of slotted brackets 18, formed as integral portions of the frame 10, with slots 20 removably accepting cylindrical mounting surfaces in the form of extruded disk segments 22, formed as integral portions of the first drive mounting structure 12. The first drive mounting area 14 also includes a pair of catches 24 formed as integral portions of the frame 10 to hold a descending foot portion 26 of the drive mounting structure 12. The second drive mounting area 16 similarly includes a second pivotal mounting structure in the form of a pair of slotted brackets 28 and a pair of catches 29, also formed as integral portions of the frame 10. The front wall 30 of the frame 10 includes a first aperture 32 through which bezels of drive units (not shown) mounted within the first drive mounting structure 12 are permitted to extend, and a second aperture 33 through which bezels of drive units mounted within the second drive mounting structure (not shown) are permitted to extend.

Figure 2:
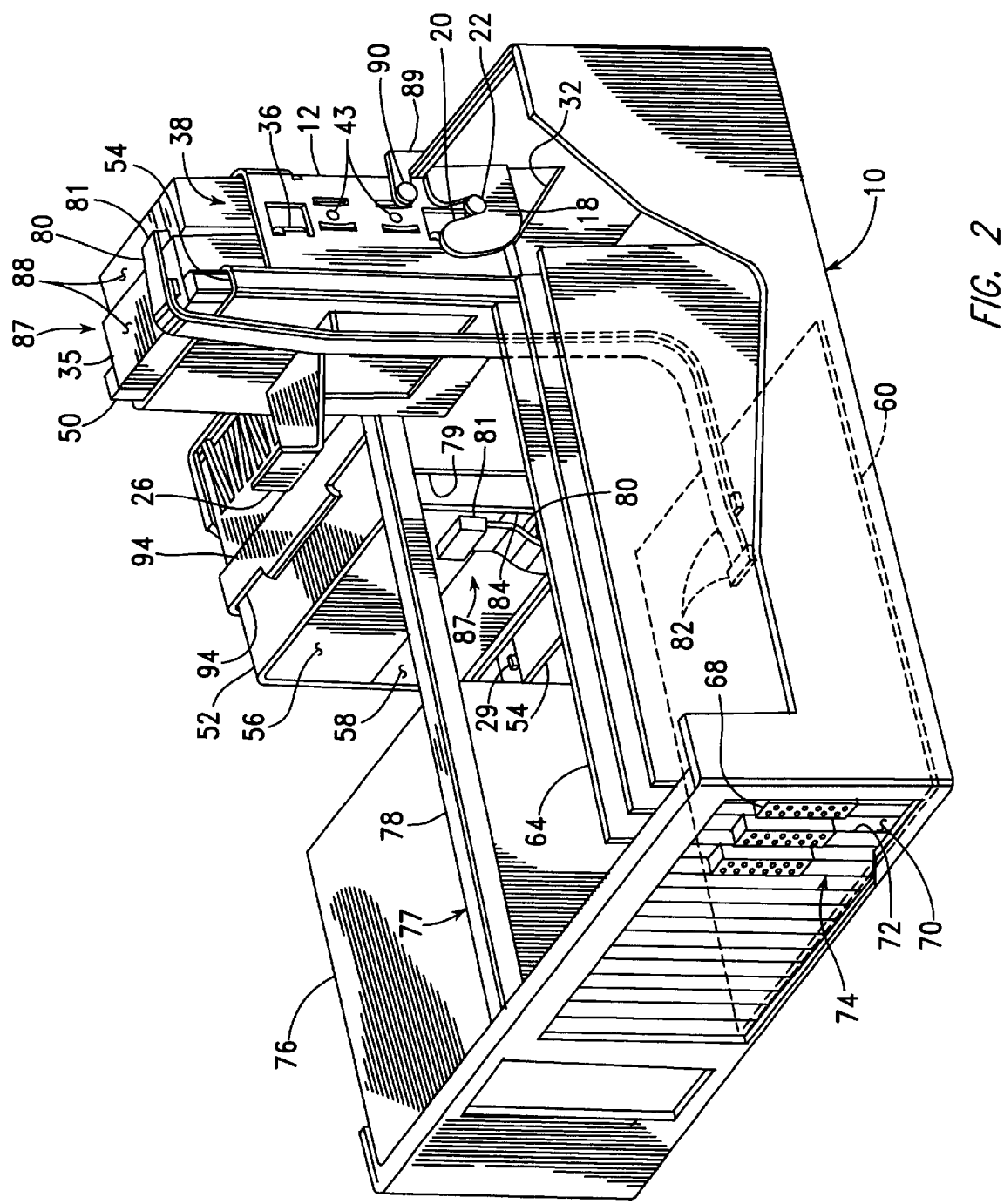
FIG. 2 is a perspective view of the frame of FIG. 1, as viewed form above, from the rear, and from the left side of the system, showing the rotatable drive mounting bracket pivoted upward into a service position and showing additional computing system components.

FIG. 2 is a perspective view of a computing system including the frame 10 and the first drive mounting structure 12, shown in its upper, or service position, which is used when a drive unit is to be installed or replaced. A floppy drive unit 34 and a hard drive unit 35 are shown installed within the structure 12.

Referring to FIGS. 1 and 2, the first drive mounting structure 12 includes a number of features associated with the mounting of drive units therein. For example, the structure 12 includes inward-turned tabs 36 forming ledges along which a drive unit being mounted in the upper portion 38 of the structure 12 is slid. The structure 12 also includes a formed cantilever spring section 40, which rests against an adjacent surface of a drive unit inserted into the upper portion 38, pushing the drive unit in the direction of arrow 42, and a pair of holes (not shown) with which a drive unit being mounted in the upper portion 38 is mounted using screws 43. The structure 12 also includes a first group of cantilever spring portions 44, extending upward in contact with a ledge 46 formed as part of the front wall 30 of the frame, and a second group of cantilever spring portions 48 extending downward to contact a drive unit mounted in the upper portion 38. The first drive mounting structure 12 is particularly configured to accept the hard drive unit 35 having a pair of rails 50 extending along opposite sides within a lower portion 51. Guiding troughs 54 are formed in the structure 12 to accept these rails 50.

FIG. 2 also shows a number of elements of the computing system which have not been shown in FIG. 1 to avoid blocking the depiction of various elements described above. In particular, a second drive mounting structure 52 is shown in the lowered operating position, being held within slotted brackets 28 (shown in FIG. 1), and being held in place by a descending foot structure 54 extending between catches 29. The second drive mounting structure 52 holds a pair of 5.25-inch drive units 56, 58. A main system board 60 is shown as mounted within the frame 10 on a number of raised attachment points 62 (shown in FIG. 1). Several adapter cards 64 extend above the main system board 60, being electrically connected thereto by means of card edge connectors 66. Various of the adapter cards 64 include external connectors 68 for attachment by cable to external peripheral devices (not shown). These external connectors 68 extend through brackets 70 attached to the adapter cards 64 and within slots 72 of a slotted bracket 74 providing for external access. A power supply 76 is shown mounted at a corner of the frame 10. The main system board 60 and the adapter cards 64 together include various conventional computing system elements, such as a processor, memory, and adapter circuits for operation of peripheral devices, such as a display unit and a printer. The frame 10 is shown to include a central stiffening structure 77, having a longitudinally extending member 78 and a vertical plate 79.

Each of the drive units 34, 35, 56, 58, is preferably connected to associated circuits by means of a flexible cable 80 which can be folded when the associated drive mounting structure 12, 52 is lowered into its operating position, but which are each of sufficient length to extend between a connection 81 to the associated drive unit and a connection 82 to the associated circuits as the drive mounting structure is raised into its service position. In this way, the connection and disconnection of each cable 78 from its associated drive unit 34, 35, 56, 58 is facilitated by moving the area in which the connection or disconnection is to take place out of a congested area, where access is made difficult by adjacent structures, such as the power supply 76 and adapter cards 64. Alternately, access to the connection 82 to an associated circuit may be provided even with the drive mounting structures 12, 52 in their operating positions, so that this connection 82 may be disconnected before the drive mounting structure 12, 52 is raised into its service position and reconnected after the drive mounting structure 12, 52 is lowered into its operating position. While, in the example of FIG. 2, these connections 82 to associated circuits are made through the main system board 60, such connections may alternately be made through other structures, such as the adapter cards 64.

While access to the screws 43 used to mount the floppy drive unit 34 within the first drive mounting structure 12 is blocked with this structure 12 in its operating position, by adjacent structures, such as the adapter cards 64, such access is provided by rotating the drive mounting structure 12 upward into its service position. Similarly, with the second drive mounting structure 52 in its operating position, access to an inner side 84 of this structure 52 is prevented by the adjacent first drive mounting structure 12, and access to an outer side (not shown) of the second drive mounting structure 52 is partly blocked by an adjacent side portion 86 (shown in FIG. 1) of the frame 10. Such access is provided by rotating the second drive mounting structure 52 upward into its service position. Thus, individual drive units of various types may be installed within either of the drive mounting structures 12, 52, with access to the sides of the mounting structure 12, 52 and to the rear opening 87 of this structure 12, 52, being provided by rotation of the structure 12, 52 from its operating position, in which the rear opening 87, and hence an internal end 88 of a drive unit installed within the structure 12, 52, extends within the computing system, into its service position, in which the rear opening 87 and the internal end 88 extends outward from the computing system.

Additionally, the drive mounting structures 12, 52 are easily lifted out of their pivoting connection with the slotted brackets 18, 28, so that various drive units can be installed within the drive mounting structures 12, 52, or removed therefrom, with these structures 12,52 completely removed from the frame 10. The drive mounting structures 12, 52 are then easily returned to their pivoting connections within the slotted brackets 18, 28.

Preferably, the apparatus also includes a pivoting support bracket 89, pivotally mounted on the drive mounting structure 12 by means of a pair of pins 90 for manual rotation between an operating position, as shown in FIG. 1, and a service position, as shown in FIG. 2. In the operating position, the pivoting support bracket 89 is lowered to avoid interference with the system cover (not shown) by extending adjacent the first drive mounting structure 12. In the service position, the pivoting support bracket 89 is rotated into a position extending over a front ledge portion 92 of the frame 10 to hold the drive mounting structure 12 in place in its service position. Preferably, the apparatus also includes a similarly-used pivoting support bracket 94, pivotally mounted on the second drive mounting structure 52.

While the drive mounting structure 12 has been described as being pivoted upward into the service position and as being pivoted downward into the operating position, it is understood that the present invention can be readily used in a tower computer configuration, having a frame extending vertically instead of horizontally, with one or more drive mounting structures pivoting outward into a service position and inward into an operating position.

While the present invention has been described in its preferred form or embodiment with some degree of particularity, it is understood that this description has been given only by way of example and that numerous changes in the details of construction, fabrication, and use, including changes in the combination and arrangement of parts, may be made without departing from the spirit and scope of the invention.

What is claimed is:

1. Apparatus for holding a drive unit within a computing system, wherein said apparatus comprises a frame of said computing system, including a pivotal mounting structure, a drive mounting structure for holding said drive unit, and a support bracket, said frame includes a ledge extending adjacent said drive mounting structure, said drive mounting structure is pivotally and removably mounted within said pivotal mounting structure, to move between an operating position holding said drive unit installed therein in an orientation with an interior end of said drive unit within said computing system and a service position holding said drive unit installed therein with said interior end extending outward from said computing system, said support bracket holds said drive mounting structure in said service position, said support bracket is pivotally mounted on said drive mounting structure to move between a position in which said support bracket lies against said drive mounting structure with said drive mounting structure in said operating position and a position in which said support bracket extends over said ledge with said drive mounting structure in said service position, said drive mounting structure includes cylindrical mounting surfaces extending outward from each of two opposite sides of said drive mounting structure, said cylindrical mounting surfaces are in coaxial alignment with one another, said pivotal mounting structure includes a pivotal mounting bracket extending adjacent each of said two opposite sides of said drive mounting structure, and said pivotal mounting brackets include slots having closed ends in which said cylindrical mounting surfaces extend and open ends through which said cylindrical mounting surfaces are withdrawn from said pivotal mounting brackets.

2. Apparatus for holding a drive unit within a computing system, wherein said apparatus comprises a frame of said computing system, including a pivotal mounting structure, and a drive mounting structure for holding said drive unit, said frame includes a flange extending adjacent said drive mounting structure, and said drive mounting structure additionally includes a first plurality of cantilevers extending to contact said drive unit installed within said drive mounting structure.

3. Apparatus for holding a drive unit within a computing system, wherein said apparatus comprises a frame of said computing system, including a pivotal mounting structure, and a drive mounting structure for holding said drive unit, said frame includes a ledge extend adjacent said drive mounting structure, and said support bracket is pivotally mounted on said drive mounting structure to move between a position in which said support bracket lies against said drive mounting structure with said drive mounting structure in said operating position and a position in which said support bracket extends over said ledge with said drive mounting structure in said service position.

\* \* \* \* \*